(No Model.)
J. LOHGES.
VEHICLE AXLE.
No. 489,487. Patented Jan. 10, 1893.
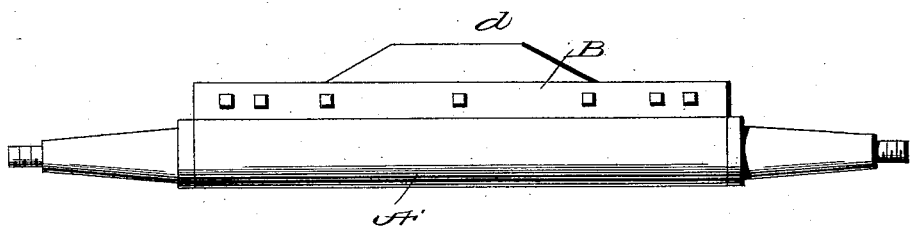
Fig. 1.
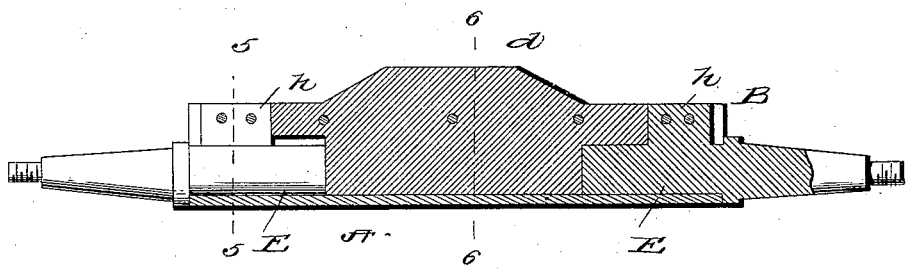
Fig. 2.
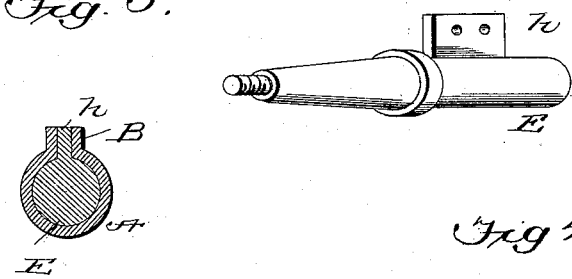
Fig. 3.
Fig. 5.
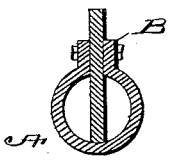
Fig. 6.
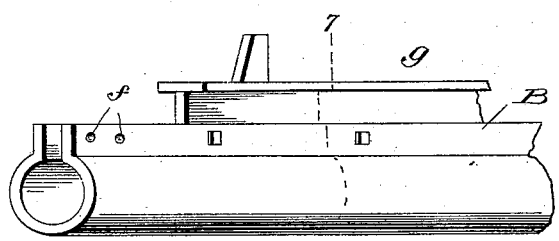
Fig. 4.
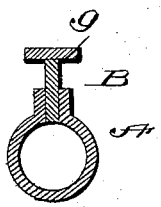
Fig. 7.
Witnesses
Inventor
John Lohges,

UNITED STATES PATENT OFFICE.

JOHN LOHGES, OF ELIZABETH, NEW JERSEY.

VEHICLE-AXLE.

SPECIFICATION forming part of Letters Patent No. 489,487, dated January 10, 1893.

Application filed August 27, 1892. Serial No. 444,333. (No model.)

*To all whom it may concern:*

Be it known that I, JOHN LOHGES, a citizen of the United States, residing at Elizabeth, in the county of Union and State of New Jersey, have invented certain new and useful Improvements in Wagon and Carriage Axles; and I do hereby declare the following to be a full, clear, and exact description of the invention, which will enable others skilled in the art to which it appertains to make and use the same.

The object of my invention is to provide a wagon or carriage axle made entirely of steel or other suitable metal one in which the spindles when worn out or broken can be taken out and replaced with new spindles economically and quickly. Furthermore the axle is so constructed that the whole gearing of a wagon can be made of steel or iron and it can be used in the construction of all kinds of vehicles now in use. The main part of the axle between the spindles is made of plate metal, steel preferred, the plate can be rolled, pressed or bent into the proper shape and the spindles can be made of round steel or iron forged and finished in the usual way as will be more fully hereinafter described and claimed.

In the drawings: Figure 1 is a side view showing axle, spindles and top of filling plate. Fig. 2 is a longitudinal vertical section, Fig. 3 a detailed view in perspective of one of the spindles. Fig. 4 is a perspective view of axle and T iron bolster. Fig. 5 is a cross section on the line 5—5 in Fig. 2. Fig. 6 is a cross section of axle and filling plate on the line 6—6 in Fig. 2. Fig. 7 is a cross section of T bolster and axle on line 7—7 in Fig. 4.

Similar letters refer to similar parts throughout the several views.

A represents the round hollow portion of axle, B the flat ribs on top side of axle the whole being made of plate metal of a uniform thickness which can be rolled pressed or bent into the desired shape as shown in the drawings. The spindle arm E is made round with the lug or rib $h$ forged solid with the spindle E and the rib $h$ on spindle is made to fit the opening between the flanges or ribs B on axle. The spindle portion E is made round to fit into the axle as shown in Fig. 5. The spindles are firmly held in the axle with bolts or rivets through holes $f\,f$ in ribs B and $h$. The spindles when worn out or broken can be taken out and replaced by new ones or repaired as may be desired, the change may be effected by simply removing the bolts or rivets $f\,f$, the spindles can then be taken out and replaced without disturbing any other part of the wagon. It will be seen that this simple method of replacing the spindles is more economical than by welding or other methods heretofore in use. The filling plate $d$ is fastened in the axle between ribs B B by means of bolts or rivets the object of the filling plate being to give the axle extra strength and durability. That portion of the filling plate projecting above the ribs B B is intended to support and carry a fifth wheel or plate which in some cases answers the same purpose. The fifth wheel or plate is secured or fastened by means of brackets or braces, the fifth wheel can be raised any desired height by raising or lowering the filling plate $d$ which answers the purpose of arching axles when necessary in the construction of wagons.

$g$ represents the T iron bolsters such as are used on farm and lumber wagons. It can be used as a substitute for wooden bolsters and is secured to the axle the same as the plain filling plate $d$.

The T iron bolster and the filling plate are not strictly a necessary part of the axle one or both can be dispensed with in the construction of light vehicles.

The ribs B B in case the filling plate is dispensed with may be bolted together, thereby forming a solid rib the whole length of axle except the open space occupied by the rib or lug $h$ used to connect spindle with axle.

Having thus described my invention what I claim as new and desire to secure by Letters Patent of the United States is

1. A hollow axle provided with longitudinal ribs or flanges and spindles removably secured in the ends of said axle by means of locking ribs on said spindles and bolts or rivets inserted through said flanges and locking ribs.

2. A hollow axle having a longitudinal opening and a filling plate secured therein substantially as described.

3. A hollow axle having a longitudinal opening and a filling plate secured therein said filling plate having a T head or flange substantially as described.

JOHN LOHGES.

Witnesses:
M. S. NELSON,
ALEXANDER NAGY,
J. C. CONNOLLY.